US008352688B2

(12) United States Patent
Chung et al.

(10) Patent No.: US 8,352,688 B2
(45) Date of Patent: Jan. 8, 2013

(54) PREVENTING UNINTENDED LOSS OF TRANSACTIONAL DATA IN HARDWARE TRANSACTIONAL MEMORY SYSTEMS

(75) Inventors: Jaewoong Chung, Bellevue, WA (US); David S. Christie, Austin, TX (US); Michael P. Hohmuth, Dresden (DE); Stephan Diestelhorst, Dresden (DE); Martin T. Pohlack, Dresden (DE); Luke Yen, Ayer, MA (US)

(73) Assignee: Advanced Micro Devices, Inc., Austin, TX (US)

( * ) Notice: Subject to any disclaimer, the term of this patent is extended or adjusted under 35 U.S.C. 154(b) by 144 days.

(21) Appl. No.: 12/946,743

(22) Filed: Nov. 15, 2010

(65) Prior Publication Data

US 2012/0124293 A1 May 17, 2012

(51) Int. Cl.
*G06F 12/00* (2006.01)
(52) U.S. Cl. ........ 711/150; 711/128; 711/141; 711/144; 711/156
(58) Field of Classification Search .................. 711/150, 711/128, 141, 144, 156
See application file for complete search history.

(56) References Cited

U.S. PATENT DOCUMENTS

| 7,206,903 | B1 * | 4/2007 | Moir et al. ..................... 711/145 |
| 7,328,316 | B2 * | 2/2008 | Moir et al. ..................... 711/150 |
| 7,395,382 | B1 * | 7/2008 | Moir ............................. 711/147 |
| 7,703,098 | B1 * | 4/2010 | Moir et al. ..................... 718/101 |
| 7,895,401 | B2 * | 2/2011 | Moir et al. ..................... 711/147 |
| 8,180,971 | B2 * | 5/2012 | Scott et al. ..................... 711/141 |
| 2008/0115042 | A1 | 5/2008 | Akkary et al. |

FOREIGN PATENT DOCUMENTS

WO 2004075046 A2 9/2004

OTHER PUBLICATIONS

Advanced Synchronization Facility http://developer.amd.com/CPU/ASF/Pages/default.aspx, 1 page. Retrieved May 10, 2011.
D. Christie, J. Chung, S. Diestelhorst, M. Hohmuth, M. Pohlack, C. Fetzer, M. Nowack, T. Riegel, P. Felber, P. Marlier, and E. Riviere, "Evaluation of AMD's Advanced Synchronization Facility Within a Complete Transactional Memory Stack," In Proceedings of Eurosys' 2010 Conference, 14 pages.
Dave Dice, Yossi Lev, Mark Moir, Dan Nussbaum, and Marek Olszewski, "Early Experience with a Commercial Hardware Transactional Memory Implementation," in ASPLOSO09:14th International Conference on Architectural Support for Programming Languages and Operating System, 2009, 60 pages.

(Continued)

*Primary Examiner* — Stephen Elmore
(74) *Attorney, Agent, or Firm* — Williams, Morgan & Amerson, P.C.

(57) ABSTRACT

A method and apparatus are disclosed for implementing early release of speculatively read data in a hardware transactional memory system. A processing core comprises a hardware transactional memory system configured to receive an early release indication for a specified word of a group of words in a read set of an active transaction. The early release indication comprises a request to remove the specified word from the read set. In response to the early release request, the processing core removes the group of words from the read set only after determining that no word in the group other than the specified word has been speculatively read during the active transaction.

20 Claims, 7 Drawing Sheets

OTHER PUBLICATIONS

Travis Skare, Christos Kozyrakis, "Early Release: Friend or Foe?," Workshop on Transactional Memory Workloads, Jun. 10, 2006, 8 pages.

Ravi Rajwar, Philip A. Bernstein "Atomic Transactional Execution in Hardware: A New High-Performance Abstraction for Databases?" In Position paper for the 10th International Workshop on High Performance Transaction Systems, Apr. 9, 2003, 5 pages.

Sean Lie, "Hardware Support for Unbounded Transactional Memory," Department of Electrical Engineering and Computer Science at the Massachusetts Institute of Technology, May 7, 2004, 111 pages.

Lance Hammond, Vicky Wong, Mike Chen, Brian D. Carlstrom, John D. Davis, Ben Hertzberg, Manohar K. Prabhu, Honggo Wijaya, Christos Kozyrakis, and Kunle Olukotun, "Transactional Memory Coherence and Consistency," In ISCA, 2004, 12 pages.

C. Scott Ananian, Krste Asanovic, Bradley C. Kuszmaul, Charles E. Leiserson, and Sean Lie, "Unbounded Transactional Memory," MIT Computer Science and Artificial Intelligence Laboratory, 2005, 12 pages.

Hammond L. et al., "Transactional Memory Coherence and Consistency"; Computer Architecture, 2004; Proceedings of the 31st Annual International Symposium on Computer Architecture; Germany 2004; pp. 102-113.

Herlihy, Maurice, et al. "Software Transactional Memory for Dynamic-Sized Data Structures;" Jul. 2003, Boston Mass, USA; pp. 92-101.

PCT Search Report; PCT/US2011/059872; Mar. 8, 2012, pp. 1-5.

PCT Written Opinion; PCT/US2011/059872; Mar. 8, 2012, pp. 1-6.

* cited by examiner

PREVENTING UNINTENDED LOSS OF TRANSACTIONAL DATA IN HARDWARE TRANSACTIONAL MEMORY SYSTEMS

BACKGROUND

Hardware Transactional Memory (HTM) is a mechanism in computer architecture for supporting parallel programming. With HTM, programmers may simply declare a group of instructions as being part of a single speculative region and the HTM hardware may then guarantee that the instructions in the region are executed as a single atomic and isolated transaction. Atomicity means that all the instructions of the transaction are executed as a single atomic block with respect to all other concurrent threads of execution on one or more other processing cores in the system. Isolation means that no intermediate result of the transaction is exposed to the rest of the system until the transaction completes. HTM systems may allow transactions to run in parallel as long as they do not conflict. Two transactions may conflict when they both access the same memory area (e.g., 8-byte word address) and either of the two transactions writes to that memory area (e.g., addressable 8-byte word).

To detect data conflicts between threads of execution, an HTM may keep track of which memory areas have been read from and/or written to speculatively during a transaction execution attempt. Memory areas that the processor tracks for the purposes of detecting data conflicts may be referred to as the read set (addresses the processor tracks as having been read) and the write set (addresses the processor tracks as having been modified) of the transaction. The read and write sets are often buffered in a speculative buffer, which is a logical entity that may be implemented by cache, load/store queue, both, and/or other hardware components.

Since HTM systems are implemented in hardware and therefore have limited resources with which to track read and write sets, various techniques have been used to make efficient use of HTM resources. One set of techniques is word grouping, whereby an HTM may group multiple addressable words and track them together in the read and/or write sets. For example, in response to detecting a speculative access to a given word in an active transaction, an HTM may mark the entire cache line in which the word resides (which holds multiple different addressable words) as being in the read or write set of the transaction. Marking a cache line may be done by setting a flag associated with the cache line. Thus, the HTM adds all the words in the cache line to the read or write set, even though only a single word in the group was speculatively accessed.

Another technique for making efficient use of HTM resources is early release. In this technique, the programmer is permitted to explicitly release an addressable word from the read set of an active transaction (e.g., using an explicit RELEASE instruction). For example, if a given transaction does not rely on a given read value beyond a certain point in the transaction, the programmer may explicitly remove from the read set, the memory address from which the value was read. Using such techniques, HTM designers have been able to increase the capacity of their systems and allow programmers to express and execute larger and more complex atomic memory transactions using HTM.

SUMMARY OF EMBODIMENTS

A method and apparatus are disclosed for implementing early release of speculatively read data in a hardware transactional memory system. A processing core comprises a hardware transactional memory system configured to receive an early release indication, such as an early release instruction, for a specified word of a group of words in a read set of an active transaction. The early release indication comprises a request to remove the specified word from the read set. In response to the early release indication, the processing core removes the group of words from the read set only after determining that no word in the group other than the specified word has been speculatively read during the active transaction.

In some embodiments, the group of words may be tracked by the hardware transactional memory system together, such that all words in the group are added to the read set of an active transaction if any one of the group of words is speculatively read during an active transaction. For example, in some embodiments, the group of words may correspond to a single cache line in a cache of the processing core and added to the read set together by setting a flag associated with the cache line. In other embodiments, the group may be tracked using an index in a Bloom filter and added to the read set by setting a flag at that Bloom filter index.

DETAILED DESCRIPTION

Figure 1:
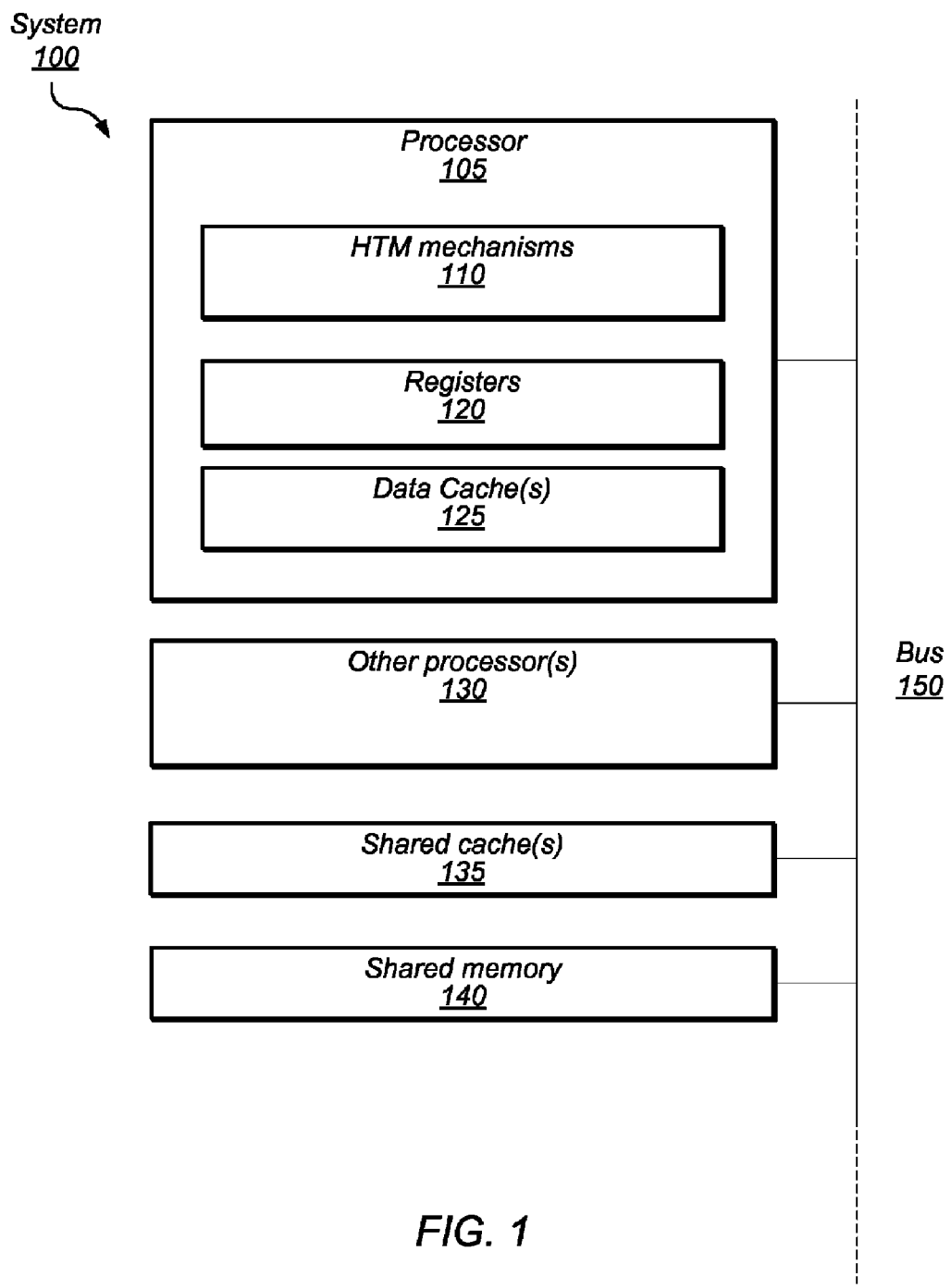
FIG. 1 is a block diagram illustrating a system configured to implement hardware transactional memory with word grouping and early release functionality, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a processor having eight processing elements or cores, the terms "first" and "second" processing elements can be used to refer to any two of the eight processing elements. In other words, the "first" and "second" processing elements are not limited to logical processing elements 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

HTM systems are implemented in hardware and therefore have limited resources with which to track read and write sets. Consequently, various techniques have been used to make efficient use of these resources. For example, such techniques include tracking addressable words as groups (i.e., word grouping), allowing a program to release a specified address from a read set (i.e., early release), and other techniques. In word grouping, the HTM may enter an entire group (e.g., cache line) into a read or write set if any word in the group is accessed. Subsequently, the HTM may detect conflicts at the granularity of an entire group rather than at the granularity of each word. For example, each cache line may include or be associated with a flag indicating if it contains speculatively accessed data. Early release may allow a programmer to explicitly remove a specified word from a read set of an active transaction, such as by explicitly executing a RELEASE instruction (as used herein, a transaction is active if it has been initiated but not yet committed). A traditional early release system in the example above, may release a given word by unsetting the flag on the cache line, thereby removing all words in the cache line from the read set.

However, traditional systems are unable to guarantee correctness when implementing both word grouping and early release optimizations. For example, if an active transaction reads and relies on two distinctly addressable words that happen to be in the same group, then a traditional word grouping system places both words (and all others in their group) in the read set of the transaction. However, if an early release mechanism is used to subsequently remove one of the two words from the read set of the active transaction, then the traditional system would release the entire group of words, including the other word. However, releasing the entire group of words in this instance is not the intent of the programmer. Rather, the programmer intended to release only the specified word. Accordingly, the traditional HTM may not detect subsequent data conflicts concerning the other word and incorrect program behavior may result (e.g., violation of atomicity). This phenomenon may be referred to herein as unintentional data release.

In some embodiments, an HTM may be configured to implement correct coexistence between word grouping and early release techniques. Such an HTM may track whether multiple words in a given group have been read by an active transaction and condition any early release of a word in the given group on a determination that no other word in the group has been accessed by the transaction. Thus, the HTM may avoid unintentionally releasing one or more words from an active transaction's read set.

FIG. 1 is a block diagram illustrating a system configured to implement hardware transactional memory with word grouping and early release functionality, according to some embodiments. According to the illustrated embodiment, system 100 includes multiple processors, including processor 105 and other processor(s) 130. As used herein, the term processor refers to a processing core configured to execute computer program instructions. Therefore, the term processor may refer to a physical or logical (e.g., symmetric multi-threading) processing core on a dedicated chip or on a chip that includes one or more other processing cores (e.g., chip multi-processor). In the latter case, processors 105 and 130 may exist on the same chip and be connected by an on-chip network rather than a system bus such as 150. Although the general term "processor" is used to describe the embodiments herein, the term itself is not meant to limit embodiments to particular arrangements of processing cores or their distribution on one or more chips.

As illustrated in FIG. 1, processor 105 comprises HTM mechanisms 110, which includes one or more hardware units configured to detect and/or to execute speculative regions of code as isolated, atomic transactions. These HTM mechanisms may include various components used by the processor to maintain correct program behavior while performing word grouping and early release operations.

As shown in the illustrated embodiment, processor 105 may also include any number of registers 120, which may be implemented as a microarchitectural register file, and one or more local data caches 125 (e.g., L1 cache). Data caches 125 may cache data from shared memory 140 for quick access by processor 105. In embodiments where data cache(s) 125 include multiple caches, those caches maybe be configured to function as a cache hierarchy. Processor 105 and/or data caches 125 may include cache coherence mechanisms configured to communicate with other processors (e.g., 130) to maintain a consistent view of memory in the presence of separate private caches used by different processors. In embodiments where processor 105 includes multiple processing cores, one or more of caches 125 may be shared by various ones of these processing cores.

In some embodiments, data cache 125 and/or shared caches 135 may be arranged as multiple blocks (i.e., cache lines), each usable to store a block of sequentially addressed words (e.g., 8-byte words) from shared memory 140. In some embodiments, different instructions may address one or more of these words. For example, an early release instruction may address a given word in data cache 125 and indicate that it is to be released from the read set of an active transaction. In different embodiments, data cache 125 and/or shared caches 135 may be managed according to different set-associativity and/or eviction policies for handling overflow of buffered data.

According to the illustrated processors 105 and 130 are connected via bus 150 to each other, to shared memory 140, and to any number of shared data caches 135. As used herein, the term memory hierarchy refers to a system's shared memory and the series of caches (i.e., cache hierarchy) used by a given processor to store data.

In some embodiments, processors 105 and 130 may utilize bus 150 to communicate messages to one another, such as cache coherence messages as part of a cache coherence protocol (e.g., MESI, MOESI). In such embodiments, multiple processors, such as 105 and 130, may maintain a consistent view of shared memory data cached in their respective caches.

In some embodiments, processor 105 may implement a speculative data buffer to support HTM transactions. In different embodiments, such a buffer may be implemented in whole or in part using data caches 125, a Bloom filter unit, and/or other mechanisms. For example, in some embodiments, HTM mechanisms 110 may associate various fields with each line in data cache 125 and use the fields to indicate whether any word in that line is in the read or write set of the active transaction.

In other embodiments, HTM mechanisms 110 may use a Bloom filter unit to keep track of read and/or write sets. In such embodiments, when a word is accessed speculatively from within a transaction, the HTM system may map the address of the word to an index of a special-purpose array (e.g., a read set Bloom filter), such as by applying a hash function to the address to derive the index. The HTM may then set a flag at the derived index to indicate that the word at the given address has been speculatively read (or written in the case of a write set Bloom filter). Although Bloom filter implementations that utilize a single array and hash function are discussed herein, one of ordinary skilled in the art will appreciate that in different embodiments, Bloom filter implementations may utilize multiple hash functions and/or arrays. The reader should note that the use of a Bloom filter to track a read set is a form of word grouping since the respective addresses of different words can map to the same Bloom filter index.

Figure 2:
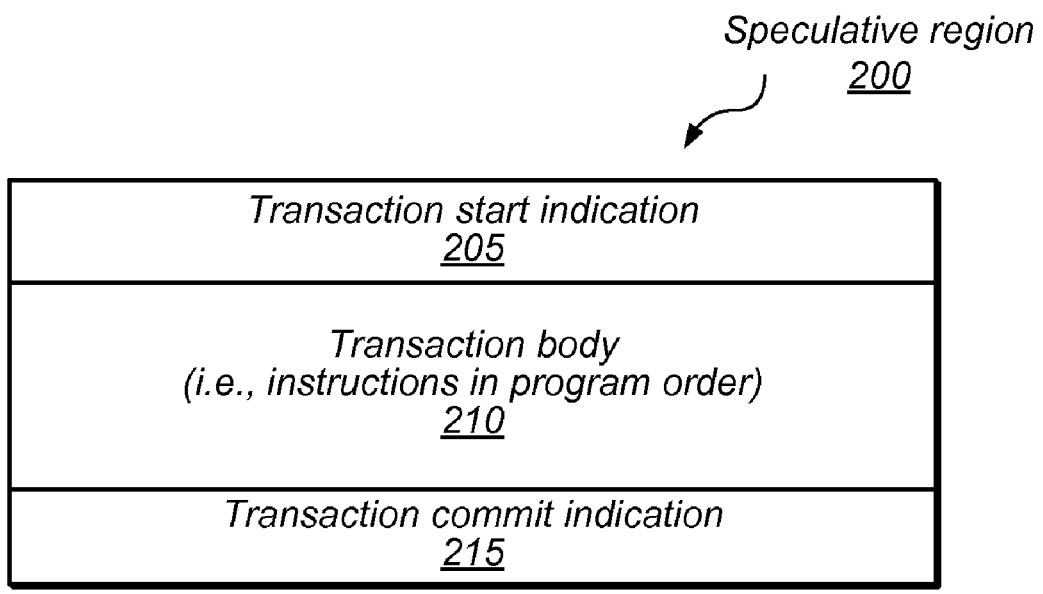
FIG. 2 is a block diagram illustrating the components of a speculative region of code, according to some embodiments.

FIG. 2 is a block diagram illustrating the components of a speculative region of code, according to some embodiments. According to the illustrated embodiment, speculative region 200 begins with a transaction start indication 205, which is followed by a transaction body 210 of one or more instructions, and ends with a transaction commit indication 215.

In some embodiments, transaction start indication may comprise a special-purpose instruction indicating the start of a speculative region. For example, the start indication 205 may include a SPECULATE instruction indicating the start of a speculative region. In other embodiments, the start indication may correspond to a general-purpose instruction, such as lock acquisition, that may be indicative of a speculative region of code. After a transaction is started but before it is committed (as in 215), the transaction is said to be active. It should be noted that due to conflicts and/or other abort conditions, an active transaction may be reattempted multiple times before eventually succeeding.

Transaction body 210 may include one or more program instructions, which may include one or more memory operations. In some embodiments, transaction body 210 may include a first subset of memory operations that are designated as part of the transaction and a second subset of memory operations that are designated as not part of the transaction. In such instances, the HTM may be configured to execute transactionally only those instructions designated as part of the transaction and to provide no such atomicity or isolation guarantees for the other instructions in the body. In such execution, the memory addresses accessed as a result of executing speculative instructions may be tracked as part of the active transaction's read or write set as appropriate.

As indicated in the illustrated embodiment, speculative region 200 may include a commit indication (e.g., 215) indicating the end of the speculative region started by start indication 205. In some embodiments, the commit indication may comprise a special-purpose COMMIT instruction. In other embodiments, the commit indication of 215 may correspond to a general-purpose instruction, such as a release of a lock acquired earlier, such as in start indication 205.

Figure 3:
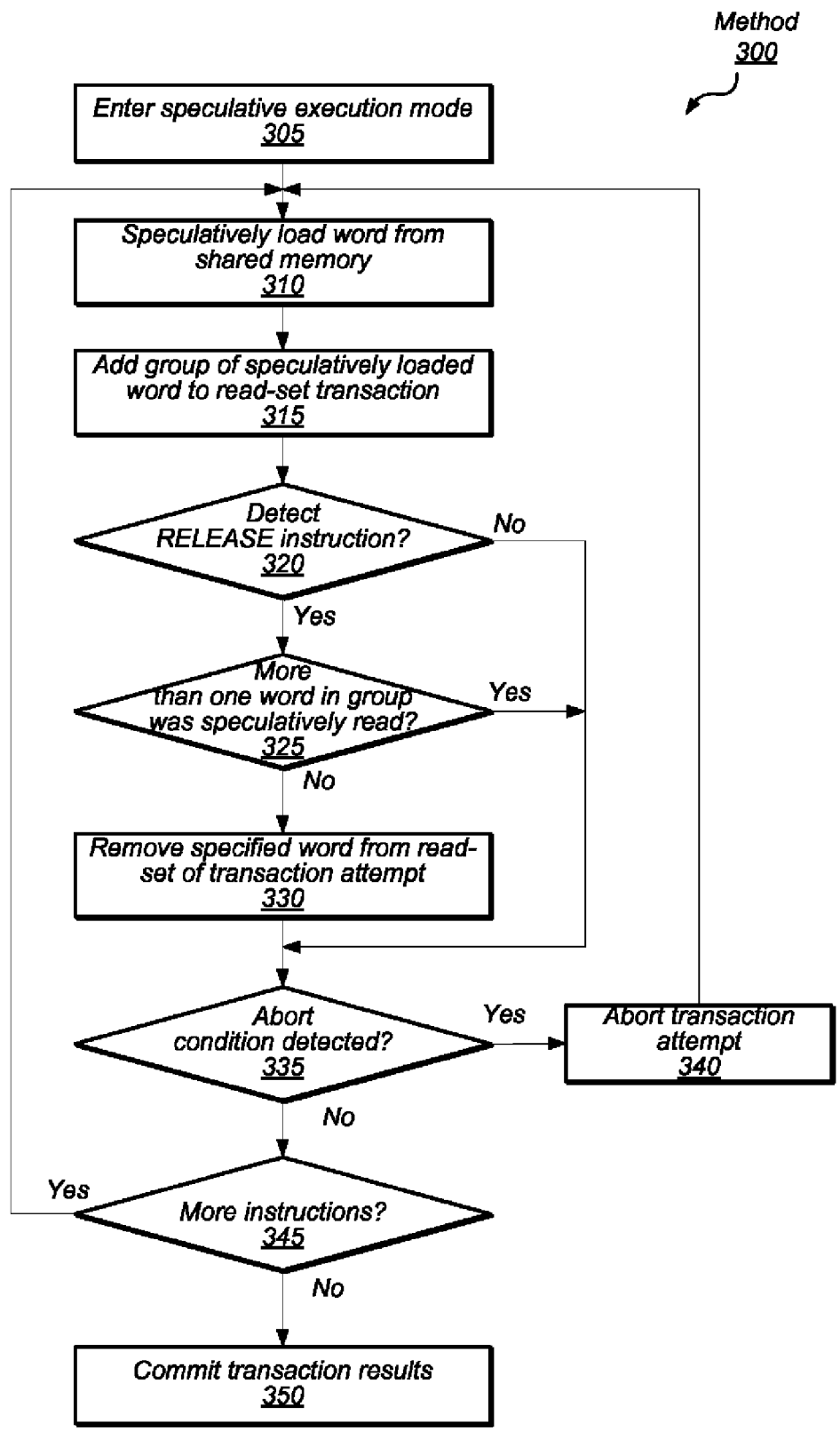
FIG. 3 is a flow diagram illustrating a high-level method of executing an atomic memory transaction using word grouping and early release techniques in a manner that avoids unintentional data release, according to some embodiments.

FIG. 3 is a flow diagram illustrating a high-level method of executing an atomic memory transaction using word grouping and early release techniques in a manner that avoids unintentional data release, according to some embodiments. The method of FIG. 3 may be executed by a processor that includes HTM mechanisms, such as processor 105.

According to the illustrated embodiment, method 300 begins when the processor enters a speculative execution mode, as in 305. As described above, the processor may enter such a mode in response to executing a SPECULATE instruction indicating the start of a transactional region of code.

As part of the transaction, the processor may speculatively load a word from shared memory, as in 310. This word may be loaded directly by a load instruction or indirectly as part of executing some other instruction. Since the data was speculatively read from within the transaction, the processor adds the speculatively loaded word (and its whole group) to the read set of the transaction, as in 315. In different embodiments, adding the word group to the read set may include setting a flag in the cache line to which the word was loaded. This effectively adds all the other words in the cache line (i.e., in the group) to the read set.

In other embodiments, adding the group to the read set in 315 may comprise setting a bit in a Bloom filter at an index corresponding to the address from which the word was speculatively loaded. For example, in 315, the HTM may derive the index by applying a hash function to the address of the speculatively loaded word. However, by setting the bit at the derived index in 315, the system essentially adds to the read set every word whose address hashes to that index value. Therefore, even if only one such address was actually speculatively read, setting a bit in a Bloom filter essentially adds a group of words to the read set being tracked by the HTM.

According to the illustrated embodiment, the processor may subsequently detect a RELEASE instruction, which specifies a word to release from the read set, as indicated by the affirmative exit from 320. In this case, the HTM may determine the group to which the specified word belongs (e.g., cache line, Bloom filter index, etc.) and determine if more than one word in the group was speculatively read, as in 325. The HTM may make this determination as described in more detail below.

If the specified word for release is the only speculatively read word in the group, as indicated by the negative exit from 325, then the HTM may remove the RELEASE-specified word from the read set, as in 330. In various embodiments, removing the RELEASE-specified word may include unsetting a flag associated with the speculatively read word and/or with its group.

However, if the HTM determines that multiple words in the group of the specified word were speculatively read in the active transaction, as indicated by the affirmative exit from 325, then the HTM does not remove the specified word from the read set. The reader should note that in some embodiments, if multiple words in the group were speculatively read, but each one was successfully released from the transaction read set before the next word in the group was read, then the decision of 325 would be decided negatively. For example, in such embodiments, if a first word in a group is read and then released, and subsequent to that release a second word in the group is read, then an attempt to release the second word (as in 320) would result in a negative determination in 325.

Once a word is released from the read set, the word may no longer cause data conflicts for the transaction. That is, if another thread writes to the address of the released word, this would not necessarily trigger a transaction abort.

According to the illustrated embodiment, as the transaction continues, if an abort condition is detected (as in 335) then the HTM may abort the transaction attempt (as in 340) and reattempt the transaction (as indicated by the feedback loop from 340 to 310). In some embodiments, reattempting the transaction may comprise issuing an explicit restart instruction. Aborting the transaction may comprise removing all words from the read and write sets, rolling back and/or dropping all memory modifications attempted by the transaction attempt, modifying the instruction pointer to point to the beginning of the transactional region, and/or other implementation-specific steps.

While the transactional region contains more instructions that have not yet been executed, as indicated by the affirmative exit from 345, the processor continues execution. When program control reaches the end of the transactional region, as indicated by the negative exit from 345, the HTM may commit the results of the transaction, as in 350. Committing the results in 350 may include flushing the results of the transaction (e.g., values in the write set) to memory, which may be done differently in different embodiments (e.g., redo versus undo models).

Figure 4A:
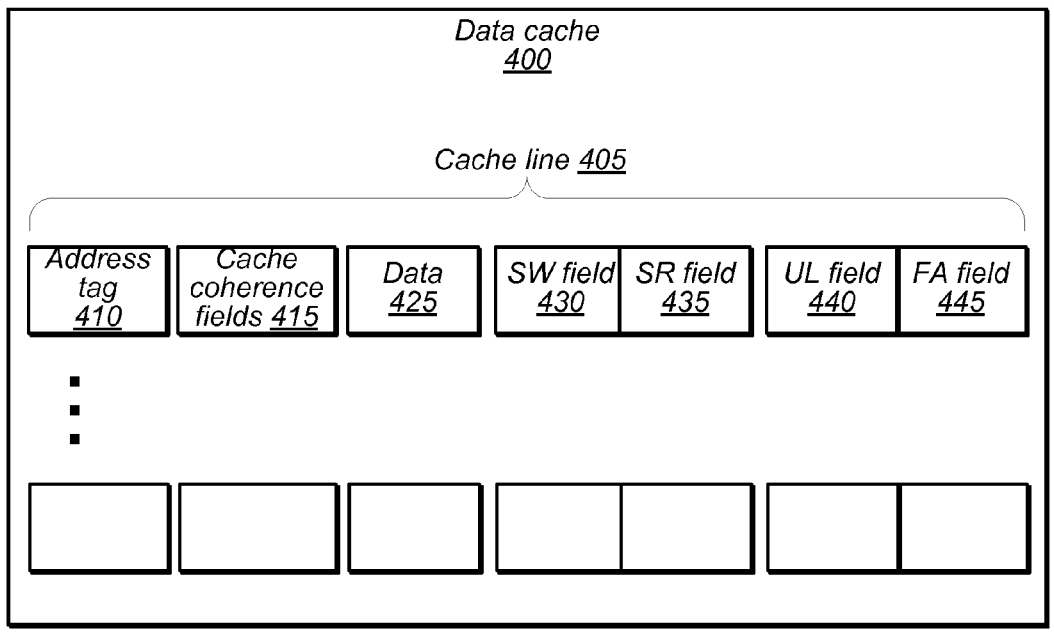
FIG. 4a is a block diagram of a cache-based speculative buffer equipped to support correct coexistence of word grouping and early release mechanisms, according to some embodiments.
Figure 4B:
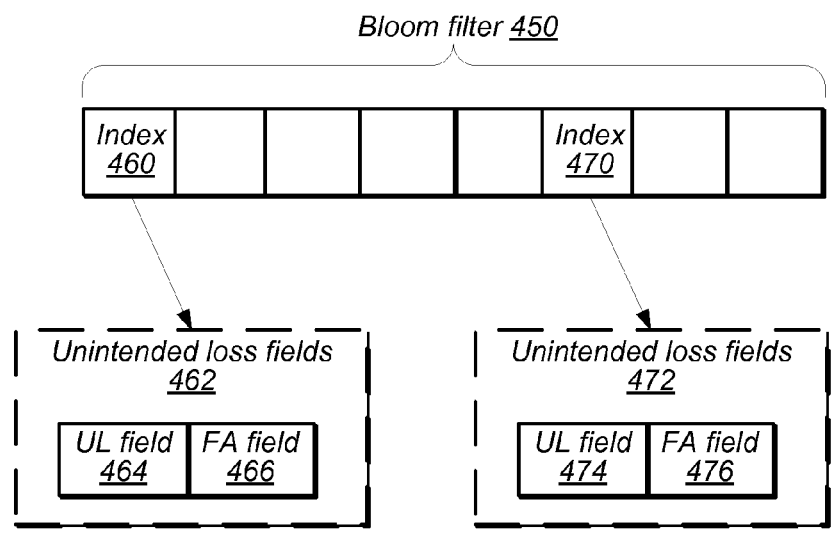
FIG. 4b is a block diagram of a Bloom filter based speculative buffer equipped to support correct coexistence of word grouping and early release mechanisms, according to some embodiments.

According to some embodiments, various flags may be added to speculative buffering mechanisms so that the processor may track whether multiple words in a given group have been speculatively read. FIG. 4a and FIG. 4b present two embodiments of speculative buffering mechanisms that include respective flags for this purpose.

FIG. 4a is a block diagram of a cache-based speculative buffer equipped to support correct coexistence of word grouping and early release mechanisms, according to some embodiments. In some embodiments, data cache 400 of FIG. 4a may correspond to a private L1 data cache, such as data cache 125 of FIG. 1.

In the illustrated embodiment, data cache 400 comprises multiple cache lines, such as cache line 405. Each line may be used to store a sequence of multiple words of data from a given region of memory. For example, data 425 of cache line 405 may comprise 64 or 128 bytes of storage space. Therefore, it may be used to store 8 or 16 addressable 8-byte words from memory. For example, if data 425 is 64-bytes long, then the shared memory may be divided into 64-byte blocks (i.e., word groups) and in response to reading any word in the block, the system may copy the entire block into a line of data cache 400 (e.g., to data 425 in cache line 405). The line may be tagged (e.g., using address tag 410) to indicate which memory block is currently being stored in the cache line.

As illustrated in FIG. 4a, cache line 405 may also include various cache coherence fields 415 usable to maintain coherence with data cached by other processors, and speculative buffer fields, such as 430 and 435. For example, in some embodiments, SW field 430 may be set to indicate that at least some data in 425 has been speculatively written by an active transaction. Likewise, SR field 435 may be usable to indicate that at least some data in 425 has been speculatively read by an active transaction. Thus, the HTM may use these fields when detecting data conflicts.

According to the illustrated embodiment, cache line 405 also includes UL field 440 and FA field 445. In some embodiments, these fields may be usable by the HTM (as in 325 of FIG. 3) to determine if more than one word in the cache line (e.g., data 425) has been speculatively read as part of an active transaction.

In some embodiments, FA field 445 may be used to store an indication of the word in cache line 405 (i.e., in data 425) that was first speculatively read during the active transaction. In various embodiments, this indication may be the address of that particular word, an index into the cache line corresponding to that word (e.g., "the $5^{th}$ word in the block"), or another identifier uniquely distinguishing the first speculatively read word from among the others. For example, in some embodiments, if cache line 405 is 64-bytes wide (i.e., holds eight uniquely addressable 8-byte words), then FA field 445 may include three bits, which are usable to indicate eight unique indices. The value of the FA field may thus identify which of the eight words stored in the cache line was the first to be speculatively read.

In some embodiments, the logic for adding a word to the read set may include determining whether the SR field 435 is already set, and if not, setting SR field 435 to a value indicating that the cache line is in the read set of the transaction and setting FA field 445 to a value indicating the word. In some embodiments, when the SR field is cleared, the FA and/or UL fields may be cleared as well.

In some embodiments, UL field 440 may be usable to indicate whether multiple words in cache line 405 have been speculatively read by the active transaction. For example, logic for adding a word to the read set may include determining whether the SR field 435 is already set and if so, determining whether the FA field indicates the word. If not, then the word is not the first word in the group to be added to the read set and the processor may set the UL field 440 to a value indicating so. In some embodiments, UL field 440 may comprise a single bit, which may be set or unset to indicate whether multiple words are in the read set. The HTM may thus use the combination of UL and FA fields to track and determine whether multiple words in a given cache line (i.e., word group) have been speculatively read by an active transaction.

Figure 5:
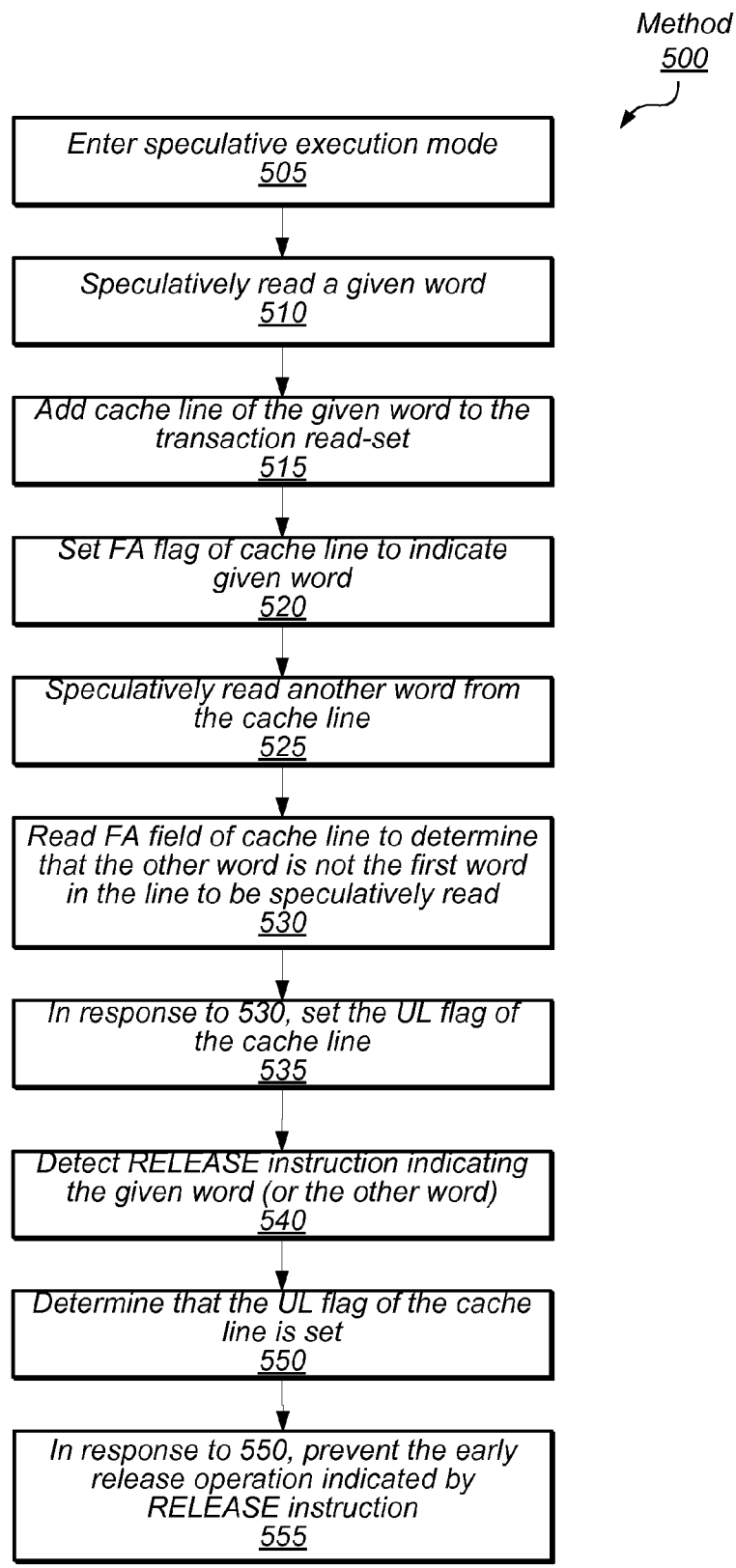
FIG. 5 is a flow diagram illustrating a method for obviating an early release operation in response to determining that multiple words in a given cache line have been speculatively read by an active transaction, according to some embodiments.

FIG. 5 is a flow diagram illustrating a method for obviating an early release operation in response to determining that multiple words in a given cache line have been speculatively read by an active transaction, according to some embodiments. Method 500 may be executed by a processor that supports both early release and word grouping as described herein.

According to the illustrated embodiment, method 500 begins when the processor enters a speculative execution mode, as in 505. The processor then speculatively reads a given word, as in 510, as part of the transaction. In response to speculatively reading the word, the memory subsystem may copy the block in which the word resides to a cache line if it is not already there. Furthermore, the HTM adds the cache line to the read set of the transaction, as in 515. In some embodiments, adding the cache line to the read set may comprise setting the SR bit of the cache line and thus effectively adding the entire block stored in the cache line to the read set.

After, or as part of, adding the cache line to the transaction read set, as in 515, the HTM may set the FA flag to a value indicating the given word, as in 520. For example, if the word read in 510 is the third word in the block according to address order, then in 520, the FA flag may be set to the binary value 010, indicating the third index according to a 0-indexing scheme. Various other identifier schemes are possible.

According to the illustrated embodiment, subsequent to speculatively reading the given word (510) and adding the cache line to the read set (515), the processor speculatively reads another word from the same, as in 525. In response to the processor reading the other word, the HTM determines that the SR field of the cache line containing the word is already set and in response, reads the FA field of the cache line (as in 530) to determine whether the other word is the same as the first word in the cache line to be read speculatively. For example, if the FA field indicates the index of the given word within the block, the HTM may determine whether the other word has the same index. If the indices are different (as in 530), then the given word and the other word are not the same.

In response to determining that the other speculatively read word is not the same as the one read in 510, the HTM sets the UL flag of the cache line, as in 535. Setting the UL flag indicates that multiple words in the cache line have been speculatively read within the current transaction. A set UL flag may indicate to the HTM that an unintended loss of transactional data may occur if the words in the cache line were all released in response to an early release instruction that is intended to target only a subset of the words.

In 540, the processor detects a RELEASE instruction specifying that the given speculatively read word is to be released from the read set. The RELEASE instruction of this example corresponds to an early release mechanism.

In response to the RELEASE instruction, the HTM locates the cache line of the given word and checks the UL flag of the cache line, determining that the UL flag is set, as in 550. Since the UL flag is set, the HTM determines that multiple words in the cache line have been read speculatively and that unintended and/or incorrect behavior may result if the entire cache line were released. Accordingly, in 555, the HTM prevents the early release functionality indicated by the RELEASE instruction. Since the early release is prevented, the HTM does not clear the SR flag of the cache line, the words in the cache line remain in the read set, and the HTM continues to check for data conflicts involving those words.

Although example of FIG. 5 includes a RELEASE instruction targeting the first word to be speculatively written, the system behavior may be analogous had the RELEASE instruction targeted the other word. Thus, in some embodiments, once at least two words in the same cache line (i.e., word group) are speculatively read, the words in that cache line may no longer be eligible for early release.

In various embodiments, unintended loss fields, such as UL and FA fields 440 and 445, may be adapted to enable word grouping with early release for speculative buffers implemented with mechanisms other than caches. For example, FIG. 4b is a block diagram illustrating a Bloom filter with unintended loss fields that enable safe coexistence of word grouping and early release, according to some embodiments.

As described above, another word grouping method by which an HTM may track a read set is by using a hardware-implemented Bloom filter. FIG. 4b is a block diagram of a Bloom-filter-based speculative buffer equipped to support correct coexistence of word grouping and early release mechanisms, according to some embodiments.

In some such embodiments, when a word is speculatively read, the HTM may determine an index for the word, such as by applying a hash function to the address of the word. The HTM may then set a flag at the index value of a special-purpose array, such as Bloom filter 450, to indicate that the word has been speculatively read. When the processor receives probes indicating that another thread has accessed a given memory address, the processor may apply the hash function to the received memory address to determine an index and check whether a flag in the Bloom filter is set at that index.

In some embodiments, the HTM may associate unintended loss fields (such as 440 and 445) with each index of a read set Bloom filter. For example, each field of Bloom filter 450 (such as indices 460 and 470) is associated with respective unintended loss fields (such as 462 and 472). In some embodiments, these fields may be part of the Bloom filter itself, contained in a separate hardware structure, or otherwise associated with respective indices of the Bloom filter.

According to the illustrated embodiment, each of the unintended loss fields 462 and 472 comprise respective UL fields (464 and 474) and FA fields (466 and 476). These fields may be analogous to fields 440 and 445 in the data cache implementation. For example, if a processor speculatively reads a word at a given address, where the address hashes to index 460, the HTM may determine whether the value at index 460 indicates that this address is already in the read set. If the value at index 460 does not indicate that this address is already in the read set, the HTM may set index 460 to such a value and set FA field 466 to a value identifying the given address. As with the data cache implementation, FA field 466 may hold the address itself, an offset into the group of addresses that map to index 466, or another identifier. For example, if the hash function used is a modulo function, then one method of deriving an identifier for the given address may be to shift the address by $\log_2(M)$ bits, where M is the number of Bloom filter indices. On the other hand, if the value in index 460 indicates that the address is already in the read set, the HTM may compare the identifier of the address with that stored in FA field 466. If the two values are not the same, then the processor has read at least two different words in the same group and the HTM may respond by setting the UL field 464 to a value indicating a danger of unintended loss from early release. As with the data cache implementation, the HTM may prevent early release operations targeting index 460 if the UL field 464 indicates that multiple words in the group have been speculatively read.

Figure 6:
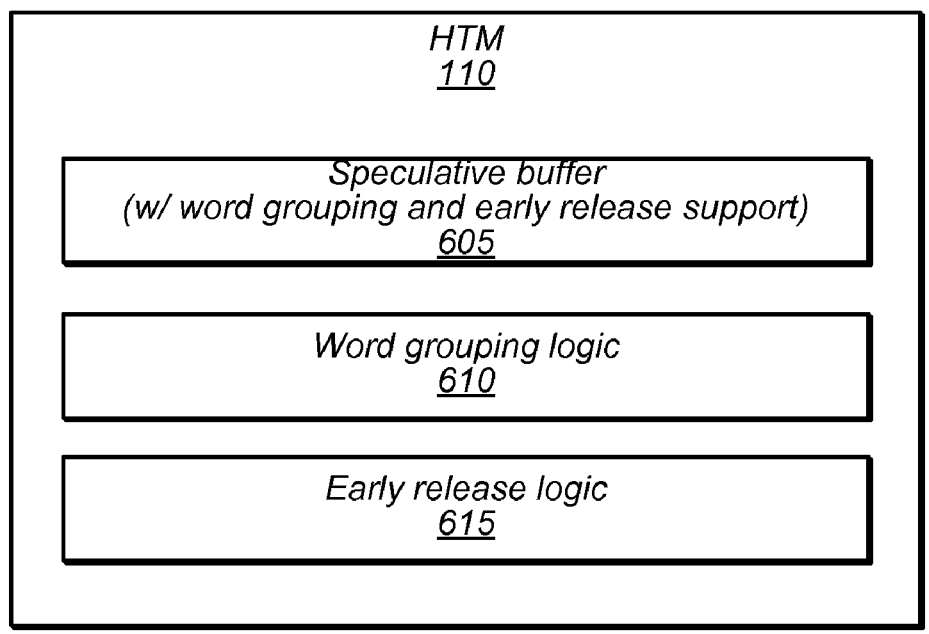
FIG. 6 is a block diagram of the components of an HTM configured to support word grouping with early release, according to some embodiments.

FIG. 6 is a block diagram of the components of an HTM configured to support word grouping with early release, according to some embodiments. HTM 110 of FIG. 6 may correspond to HTM mechanisms 110 of FIG. 1.

According to the illustrated embodiment, HTM 110 may include a speculative buffer, such as 605, that supports both word grouping and early release. In some embodiments, speculative buffer 605 may be implemented using cache (e.g., data cache 400), using a Bloom filter (e.g., Bloom filter 450), and/or using other mechanisms. In some embodiments, speculative buffer 605 may include fields usable to indicate that at least one of a group of words in shared memory is in the read set of a transaction (e.g., SR field 435, index 460, etc.). In some embodiments, speculative buffer 605 may also include fields usable to indicate whether multiple words in a given group have been speculatively read within an active transaction (e.g., UL fields 440, 464, 474, etc.).

In the illustrated embodiment, HTM 110 also includes word grouping logic 610 configured to determine and set appropriate flags in speculative buffer 605 when a given word is speculatively read. For example, if speculative buffer 605 is implemented as data cache 400 in FIG. 4a, then word grouping logic 610 may be configured to read and set the SR, UL, and FA fields corresponding to a given address in response to the word at that address being speculatively read.

According to the illustrated embodiment of FIG. 6, HTM 110 may also include early release logic 615, which may be configured to implement word grouping aware early release functionality. For example, early release logic 615 may be configured to execute a RELEASE instruction specifying a memory address to release from a read set of an active transaction, as described herein. Logic 615 may also be configured to determine the group of the specified address and to prevent such functionality in response to determining that multiple words in the group have been speculatively read by the active transaction. For example, early release logic 615 may determine if more than one word in the group has been read, at least in part, by reading an appropriate UL field in speculative buffer 605.

Although speculative buffer 605, word grouping logic 610, and early release logic 615 are shown in FIG. 6 as distinct components, in various embodiments, they may be combined and/or further divided. In some embodiments, HTM 110 may further include various other components, such as cache coherence mechanisms, abort logic, commit logic, out-of-order execution support, etc.

Figure 7:
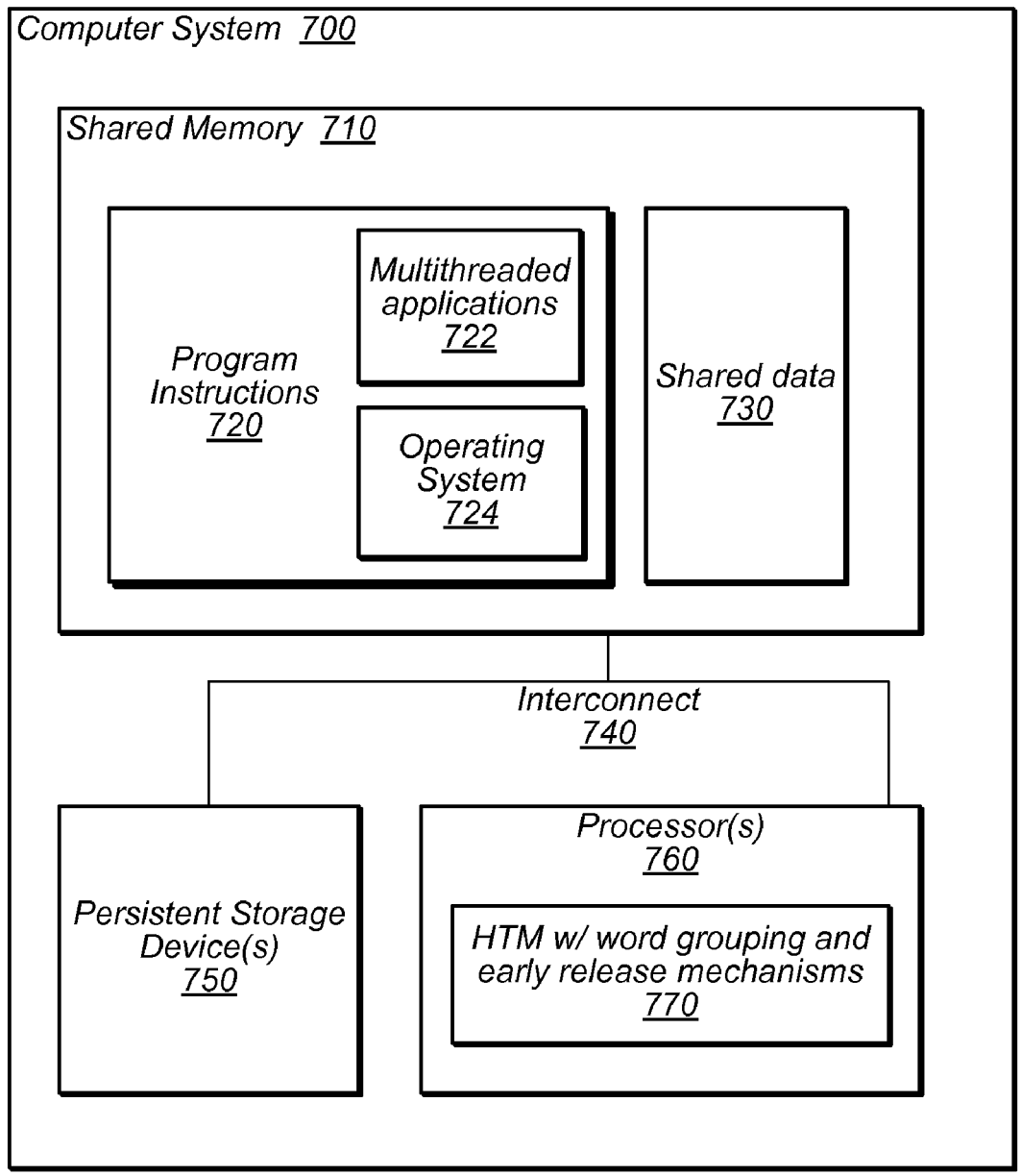
FIG. 7 is a block diagram illustrating a computer system configured to implement hardware transactional memory with word grouping and early release mechanisms as described herein, according to various embodiments.

FIG. 7 is a block diagram illustrating a computer system configured to implement hardware transactional memory with word grouping and early release mechanisms as described herein, according to various embodiments. The computer system 700 may correspond to any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

Computer system 700 may include one or more processors 760, any of which may include multiple physical and/or logical cores. Processors 760 may include respective mechanisms to implement HTM with word grouping and early release mechanisms as described herein, such as mechanisms 770. For example, in some embodiments, HTM 770 may include an appropriate speculative buffer, such as data cache 400 and/or Bloom filter 450.

Computer system 700 may also include one or more persistent storage devices 750 (e.g. optical storage, magnetic storage, hard drive, tape drive, solid state memory, etc), which may persistently store data.

According to the illustrated embodiment, computer system 700 may include one or more shared memories 710 (e.g., one or more of cache, SRAM, DRAM, RDRAM, EDO RAM, DDR 10 RAM, SDRAM, Rambus RAM, EEPROM, etc.), which may be shared between multiple ones of processors 760. The one or more processors 760, the storage device(s) 750, and the shared memory 710 may be coupled via interconnect 740. In various embodiments, the system may include fewer or additional components not illustrated in FIG. 7 (e.g., video cards, audio cards, additional network interfaces, peripheral devices, a network interface such as an ATM interface, an Ethernet interface, a Frame Relay interface, monitors, keyboards, speakers, etc.).

In some embodiments, shared memory 710 may store program instructions 720, which may be encoded in platform native binary, any interpreted language such as Java™ bytecode, or in any other language such as C/C++, Java™, etc. or in any combination thereof. Program instructions 720 may include program instructions to implement one or more multi-threaded applications 722, which include speculative sections of code to be executed respectively as single atomic transactions. In some embodiments, program instructions 720 may also include instructions executable to implement an operating system 724 that provides software support for executing applications 722 (e.g., scheduling, software signal handling, etc.).

According to the illustrated embodiment, shared memory 710 may include shared data 730, which may be accessed by multiple ones of processors 760. Ones of processors 760 may cache various components of shared data 730 in local caches, and coordinate the data in these caches by exchanging messages according to a cache coherence protocol, as described herein.

Program instructions 720, such as those used to implement multithreaded applications 722 and/or operating system 724, may be stored on a computer-readable storage medium. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions.

A computer-readable storage medium as described above may be used in some embodiments to store instructions read by a program and used, directly or indirectly, to fabricate the hardware comprising one or more of processors 760. For example, the instructions may describe one or more data structures describing a behavioral-level or register-transfer level (RTL) description of the hardware functionality in a high level design language (HDL) such as Verilog or VHDL. The description may be read by a synthesis tool, which may synthesize the description to produce a netlist. The netlist may comprise a set of gates (e.g., defined in a synthesis library), which represent the functionality of processor 500. The netlist may then be placed and routed to produce a data set describing geometric shapes to be applied to masks. The masks may then be used in various semiconductor fabrication steps to produce a semiconductor circuit or circuits corresponding to processor 500. Alternatively, the database may be the netlist (with or without the synthesis library) or the data set, as desired.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus comprising:
a hardware transactional memory system configured to receive an early release indication for a specified word of a group of two or more words in a read set of an active atomic memory transaction attempt, wherein:
the hardware transactional memory system is configured to remove the group of words from the read set in response to: receiving the early release indication and determining that no word in the group other than the specified word has been speculatively read during the active atomic memory transaction attempt.

2. The apparatus of claim 1, wherein the early release indication comprises an explicit early release instruction identifying the specified word.

3. The apparatus of claim 1, wherein the hardware transactional memory system is configured to add the group of words to the read set of the active atomic memory transaction attempt in response to the processing core speculatively reading any one of the group of words, wherein the one word is first in the group to have been speculatively read as part of executing the active atomic memory transaction attempt.

4. The apparatus of claim 3, wherein
the group of words corresponds to a single cache line in a cache of the processing core; and
adding the group of words to the read set comprises setting a flag associated with the cache line to indicate that the group of words in the cache line is in the read set of the active transaction.

5. The apparatus of claim 3, wherein adding the group of words to the read set comprises setting a flag at a given index of a storage array, wherein for each word in the group of words, the index corresponds to a result of applying a given hash function to a respective address in a shared memory at which the word is stored.

6. The apparatus of claim 3, wherein adding the group of words to the read set of the active atomic memory transaction attempt comprises recording an indication of the one word in the group that was first to be speculatively read within the active transaction.

7. The apparatus of claim 6, wherein the indication of the one word comprises an index indicating a position of the one word in an ordering of the group of words.

8. The apparatus of claim 6, wherein the hardware transactional memory is further configured to respond to the processing core reading another word in the group subsequent to reading the one word by:
determining whether the one word and the another word correspond to the same memory address; and
in response to determining that the one word and the another word do not correspond to the same memory address, recording an indication that multiple words in the group have been speculatively read.

9. The apparatus of claim 8, wherein the determination that no word in the group other than the specified word has been speculatively read during the active atomic memory transaction attempt is dependent on the indication that multiple words in the group have been speculatively read.

10. The apparatus of claim 1, wherein the early release indication specifies multiple words of the group to remove from the read set and wherein the hardware transactional memory system is further configured to remove the specified multiple words from the read set based, at least in part, on a determination that no word in the group other than the specified multiple words has been speculatively read during the active transaction.

11. A method comprising:
a hardware transactional memory system receiving an early release indication for a specified word of a group of two or more words in a read set of an active atomic memory transaction attempt; and
responsive to no other word in the group having been speculatively read during the active atomic memory transaction attempt, the hardware transactional memory system removing the group of words from the read set of the active atomic memory transaction attempt.

12. The method of claim 11, wherein the early release indication comprises an explicit early release instruction identifying the specified word.

13. The method of claim 11, further comprising before receiving the early release indication, adding the group of words to the read set of the active atomic memory transaction attempt in response to a processing core speculatively reading one of the group of words, wherein the one word is the first in the group to have been speculatively read as part of executing the active transaction.

14. The method of claim 13, wherein the group of write set words corresponds to a single cache line of a cache, and wherein adding the group of words to the read set comprises setting a flag associated with the cache line to indicate that the group of words in the cache line is in the read set of the active transaction.

15. The method of claim 13, wherein adding the group of words to the read set comprises setting a flag at a given index of a storage array, wherein for each word in the group of words, the index corresponds to a result of applying a given hash function to a respective address in a shared memory at which the word is stored.

16. The method of claim 13, wherein adding the group of words to the read set of the active atomic memory transaction attempt comprises recording an indication of the one word in the group that was first to be speculatively read within the active transaction.

17. The method of claim 16, wherein the indication of the one word comprises an index indicating a position of the one word in an ordering of the group of write set words.

18. The method of claim 16, further comprising:
in response to another word in the group being speculatively read subsequent to the one word being read and determining that the one word and the another word do not correspond to the same memory address: recording an indication that multiple words in the group have been speculatively read.

19. A non-transitory computer readable storage medium comprising a data structure which is operated upon by a program executable on a computer system, the program operating on the data structure to perform a portion of a process to fabricate an integrated circuit including circuitry described by the data structure, the circuitry described in the data structure including:
  a hardware transactional memory system configured to receive an early release indication for a specified word of a group of two or more words in a read set of an active atomic memory transaction attempt, wherein:
    the hardware transactional memory system is configured to remove the group of words from the read set in response to: receiving the early release indication and determining that no word in the group other than the specified word has been speculatively read during the active atomic memory transaction attempt.

20. The non-transitory computer readable storage medium of 19, wherein the storage medium stores HDL, Verilog, or GDSII data.

* * * * *